United States Patent
Gougian

(10) Patent No.: US 8,020,439 B2
(45) Date of Patent: Sep. 20, 2011

(54) MEASURING CYLINDERS

(76) Inventor: Susan Lucia Gougian, Pepperell, MA (US)

( * ) Notice: Subject to any disclaimer, the term of this patent is extended or adjusted under 35 U.S.C. 154(b) by 224 days.

(21) Appl. No.: 12/381,071

(22) Filed: Mar. 7, 2009

(65) Prior Publication Data

US 2010/0223994 A1 Sep. 9, 2010

(51) Int. Cl.
*G01F 19/00* (2006.01)
(52) U.S. Cl. ............................. 73/426; 73/427
(58) Field of Classification Search ............ 73/429, 73/427
See application file for complete search history.

(56) References Cited

U.S. PATENT DOCUMENTS

| | | | |
|---|---|---|---|
| 3,874,085 A | 4/1975 | Atkins | |
| 4,039,497 A * | 8/1977 | Troussier et al. | 524/401 |
| 4,154,109 A * | 5/1979 | Kelson | 73/429 |
| 4,214,369 A | 7/1980 | Wasik et al. | |
| 4,333,241 A | 6/1982 | Wasik et al. | |
| D266,820 S | 11/1982 | Ferrin | |
| D281,301 S | 11/1985 | Spolar | |
| 5,992,035 A | 11/1999 | Otsu | |
| D490,725 S | 6/2004 | Kaposi et al. | |
| 6,775,921 B2 | 8/2004 | Spark et al. | |
| D499,029 S | 11/2004 | Maarberg | |
| 2008/0131703 A1 * | 6/2008 | Buffard et al. | 428/421 |

FOREIGN PATENT DOCUMENTS

GB 2374146 A 9/2002

OTHER PUBLICATIONS

"Spaghetti Doser", Normann Copenhage, Mar. 2007, available on the internet <http://www.normann-copenhage.com>.
"Mario Spaghetti Measure", Addict Creative Labs, 2005, available on the internet <http://www.addictlab.com>.
"Kaiser Bakeware Cookie Cutters", Kaiser Bakeware, Dec. 2005, available on the internet <http://www.achive.org>.

* cited by examiner

*Primary Examiner* — Lisa Caputo
*Assistant Examiner* — Jamel Williams

(57) ABSTRACT

A food measuring tool comprising of a plurality of hollow right cylinders. A set of free standing measuring cylinders each one comprising of a single piece of solid, flexible or non flexible material. A set of measuring cylinders each one to be used for measuring a multitude of food products. A set of measuring cylinders to be used as an accurate measuring tool to determine the correct portion sizes for food according to the recommendations of the United States Food and Drug Administration and the American Diabetes Association.

2 Claims, 1 Drawing Sheet

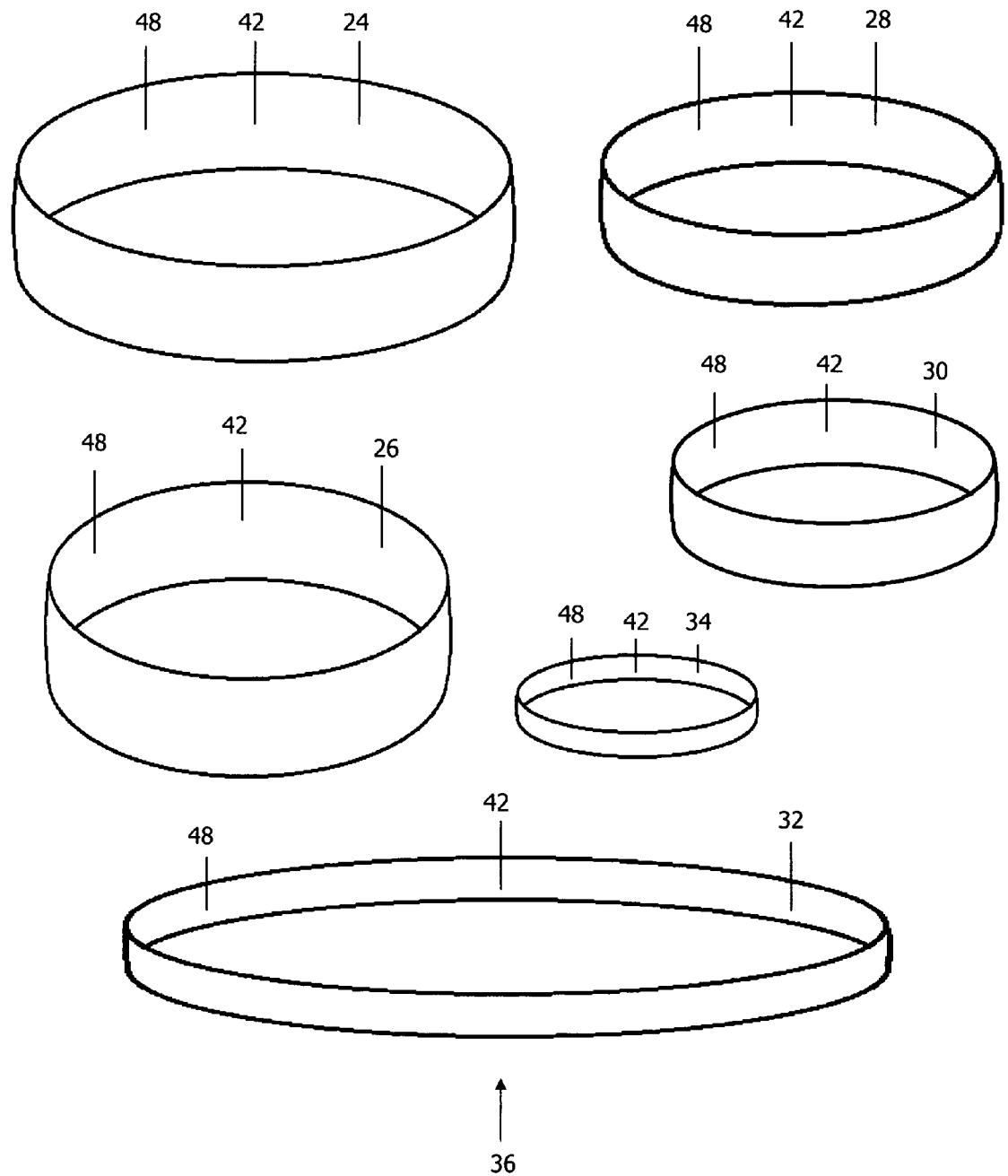

MEASURING CYLINDERS

CROSS-REFERENCE TO RELATED APPLICATIONS

Not Applicable

STATEMENT REGARDING FEDERALLY SPONSORED RESEARCH OF DEVELOPMENT

Not Applicable

REFERENCE TO MICROFICHE APPENDIX

Not Applicable

BACKGROUND OF THE INVENTION

1. Field of the Invention

The present invention relates to a measuring cup used in kitchens during food preparation. The present invention relates to a measuring cup comprised a single piece of non flexible material.

2. Description of the Prior Art

A conventional measuring cup is usually in the form of a container having a handle, a pour lip and a solid bottom. A conventional measuring cup usually has one or more scale markings used to designate one volume or several volumes. A conventional measuring cup is usually in the form of a cylinder. A conventional measuring cup is used in kitchens to measure food products during food preparation.

A conventional measuring cup is used to measure dry ingredients such as flour and sugar, and liquids such as milk and water. Conventional measuring cups are not practical for measuring prepared foods such as mashed potatoes and gravy, hot oatmeal, cooked pasta and cheese sauce or rice pilav. Prepared foods such as these stick in measuring cups and are difficult to remove. Repeat use of the same measuring cup for different food products can result in cross contamination. Hot food can become cold during transfer from a measuring cup to a serving plate or to a serving bowl.

Conventional measuring spoons are used for measuring dry or liquid food products. Conventional measuring spoons are not intended for measuring large portions of food. Dried pasta measuring tools are limited to measuring dried pasta. They are not designed to measure a multitude of food products. Dried pasta measuring tools lack the capacity for measuring foods such as oatmeal, mashed potatoes or rice.

3. Objects and Advantages

The present invention is a set of hollow measuring cylinders to be used to measure food at the time of serving a meal. The measuring cylinder, selected for use, is to be placed on a plate or in a bowl. The food being measured by placing the food into the measuring cylinder until the cylinder is filled to scale. The measuring cylinder should be removed from the plate or the bowl leaving a correct portion size of food on the plate or in the bowl. Several measuring cylinders may be placed on the same plate to measure food at the time of serving a meal. The present invention eliminates the step of transferring food from a measuring cup to a plate or to a bowl. Hot food will stay hot when served directly to a plate or to a bowl. The measuring cylinders having a heat resistant, slippery, non stick surface prevents food from sticking to the cylinders and allows the cylinders to remain cool to the touch. The measuring cylinders having a non stick surface easily release from around the food product being measured. The measuring cylinders having the capacity to measure a multitude of food products including prepared foods such as oatmeal or rice.

The present invention is a solution to long felt but unsolved need of diabetics and overweight individuals for an improved food measuring tool. The present invention enables the dieter to quickly, easily and neatly measure a correct portion size for a multitude of food products.

Obesity is a major health problem in the United States. Obesity can lead to hypertension, heart disease and type 2 diabetes. It is estimated that 60% of the population in the United States is overweight and weight loss aids of any kind are welcome by the medical profession.

BRIEF SUMMARY OF THE INVENTION

The measuring cylinders are simply constructed and each cylinder comprising of a single piece of solid, flexible or non flexible material. The measuring cylinders each having a geometric shape, being round or oval. The measuring cylinders each having a different calculated capacity, being 1 cup, ¾ cup, ⅔ cup, ⅓ cup, ⅜ cup and ⅛ cup. The measuring cylinders are free standing, each measuring cylinder having a different length, width, height, and depth. The measuring cylinders function as accurate measuring tools and as a guide to the correct portion sizes for food according to the recommendations of the United States Food and Drug Administration and the American Diabetes Association.

BRIEF SUMMARY OF THE DRAWING

A plan view of measuring cylinders according to the present invention.

DETAILED DESCRIPTION OF THE INVENTION

The measuring cylinders 36 being structurally hollow right cylinders. The measuring cylinders 36 being hollow from the top end to the bottom end. The measuring cylinders 36 having a top end diameter parallel to a bottom end diameter of equal measurement. The measuring cylinders 36 each having a geometric shape being a round or an oval shape. The measuring cylinders 36 being three dimensional each having a calculated depth, a calculated width and a calculated height. The measuring cylinders 36 each having a specific length, width, height, depth, volume and capacity. The measuring cylinders 36 each having a different calculated capacity, being 1 cup, ¾ cup, ⅔ cup, ⅓ cup, ⅜ cup and ⅛ cup. The body of the measuring cylinders 36 each being of uniform thickness. The body of the measuring cylinders 36 each having a seamless construction. The measuring cylinders 36 each having smooth, dull, flat edges on the top end and on the bottom end of each measuring cylinder.

Referring to the drawing, the material for the hollow measuring cylinders 36 is furnished preferably by a plastic resin, including polytetrafluoroethylene, acrylonitrile butadiene styrene or polycarbonate, but can be comprised of metal, including aluminum and stainless steel.

Referring to the drawing, each of the hollow measuring cylinders 24, 26, 28, 30, 32, 34 is comprised of a single piece of solid, flexible or non flexible material, preferably plastic, formed into a round or oval structure. Where plastic is used, metal molds are needed to manufacture the measuring cylinders. The metal molds should be made using a tool or machine well known in the art. The metal molds should each preferably be comprised of one individual cavity, each having specific dimensions necessary to manufacture each distinct measuring cylinder. The metal molds preferably having scale markings and other markings necessary to produce indicium on each of the plastic measuring cylinders.

Where plastic is used, an engineering plastic resin which provides a heat resistant, slippery, non stick surface 48 to the finished product should be chosen. Where plastic is used, plastic pellets should be poured into a specialized machine well known in the art, to be melted and poured in to each distinct mold to harden and to form each distinct measuring cylinder.

Preferred dimensions for the measuring cylinders 24, 26, 28, 30, 32, 34 will be given for instructional purposes, but not as a limitation. The plastic material 42 being about 1/16 inch thick. The 1 cup round measuring cylinder 24 being about 4½ inches in diameter and about 7/8 inch in height. The 3/4 cup round measuring cylinder 26 being about 3½ inches in diameter and about 1 inch in height. The ½ cup oval measuring cylinder 28 being about 3¼ inches in length by about 2¼ inches in width and about 1 inch in height. The 1/3 cup round round measuring cylinder 30 being about 2½ inches in diameter and about 3/4 inch in height. The 3/8 cup oval measuring cylinder 32 being about 5¼ inches in length by 3¼ inches in width and about ¼ inch in height. The 1/8 cup measuring cylinder 34 being about 2 inches in diameter and about ¼ inch in height.

Where plastic is used, colored plastic is preferred. Where colored plastic is used, each measuring cylinder should be formed in a different color for easy identification. The 1 cup round measuring cylinder 24, to be used to measure raw vegetables should be formed using dark green plastic. The 3/4 cup round measuring cylinder 26 to be used to measure cereals should be formed using dark yellow plastic. The ½ cup oval measuring cylinder 28 to be used to measure cooked vegetables or fruits should be formed using light green plastic. The 1/3 cup round measuring cylinder 30 to be used to measure rice or grains should be formed using white plastic. The 3/8 cup oval measuring cylinder 32 to be used to measure meat, poultry or fish should be formed using red plastic. The 1/8 cup round measuring cylinder 34 to be used to measure cheese or nuts should be formed using light yellow plastic.

The above description of the preferred embodiment of the present invention may be changed or modified by those skilled in the art, to which the invention appertains, without departing from scope of the invention, which is intended to be limited only by the scope of the claims.

Another embodiment of the measuring cylinders, 24, 26, 28, 30, 32, 34 may be accomplished by using all oval or all round shaped metal molds, or any combination thereof in which to form the measuring cylinders.

Another embodiment of the measuring cylinders 24, 26, 28, 30, 32, 34 may be accomplished by using metal to construct each of the measuring cylinders. Where metal is used, the metal being finished by applying a coating of an engineering plastic resin to the entire surface area of each of the measuring cylinders. The engineering plastic resin providing a heat resistant, slippery, non stick surface to each of the measuring cylinders.

Instructions for use will now be given for the present invention measuring cylinders 24, 26, 28, 30, 32, 34. The measuring cylinder selected for use is to be placed on a plate or in a bowl. The food being measured should be placed into the measuring cylinder until the measuring cylinder is filled to scale. The measuring cylinder should be removed from the plate or the bowl leaving a correct portion size of food on the plate or in the bowl. Several measuring cylinders may be placed on the same plate to measure food at the time of serving a meal.

I claim:

1. A food measuring tool comprising:
   a plurality of hollow right cylinders each constructed of a single piece of solid, heat resistant, slippery, non stick plastic material;
   said heat resistant, slippery, non stick plastic material, selected from a group consisting of plastic resins including polytetrafluoroethylene, acrylonitrile butadiene styrene, and polycarbonate;
   said heat resistant, slippery, non stick plastic material being about 1/16 inch thick;
   said hollow right cylinders each having a different calculated capacity;
   said heat resistant, slippery, non stick plastic material being flexible or non flexible;
   said hollow right cylinders each being free standing.

2. A food measuring tool of claim 1,
   said hollow right cylinders each having a different diameter;
   said hollow right cylinders each having a different color.

* * * * *